United States Patent

Kim et al.

[11] Patent Number: 5,785,929
[45] Date of Patent: Jul. 28, 1998

[54] WASTE GAS DISPOSAL APPARATUS

[75] Inventors: Hee-duck Kim, Kyonggi-do; Kyue-sang Choi; Jin-man Kim, both of Seoul, all of Rep. of Korea

[73] Assignee: Samsung Electronics Co., Ltd., Suwon, Rep. of Korea

[21] Appl. No.: 825,225

[22] Filed: Mar. 19, 1997

[30] Foreign Application Priority Data

Aug. 9, 1996 [KR] Rep. of Korea .................. 96-33003

[51] Int. Cl.$^6$ ................................................ B01D 50/00
[52] U.S. Cl. ......................... 422/171; 422/172; 422/177; 55/223
[58] Field of Search ........................... 422/171, 172, 422/177; 55/223; 423/243.02

[56] References Cited

U.S. PATENT DOCUMENTS

| | | | |
|---|---|---|---|
| 4,133,657 | 1/1979 | Krogsrud | 55/290 |
| 4,214,881 | 7/1980 | Filss | 55/228 |
| 4,353,720 | 10/1982 | Margraf | 55/262 |
| 4,372,761 | 2/1983 | Lindroos | 55/260 |
| 5,183,646 | 2/1993 | Anderson et al. | 423/210 |
| 5,405,590 | 4/1995 | Macedo et al. | 423/210 |
| 5,616,156 | 4/1997 | Keersmaekers | 55/269 |

*Primary Examiner*—Nina Bhat
*Attorney, Agent, or Firm*—Jones & Volentine, L.L.P.

[57] ABSTRACT

A waste gas disposal apparatus includes a scraper rotating portion for rotating a scraper configured to simultaneously scrape off fine reactant particles adsorbed to an inner surface of a waste gas collecting unit and a surface of a cone in a collection inducing portion of the collection unit. The scraper is designed to be fixed to a scraper support rod, which is formed coaxially with a cone support rod and rotated through a 360° arc. The fine reactant particle collection efficiency is much higher compared with conventional devices that only rotate through a 180° arc, and must repeatedly reverse directions during scraping operations.

10 Claims, 9 Drawing Sheets

WASTE GAS DISPOSAL APPARATUS

BACKGROUND OF THE INVENTION

1. Field of the Invention

The present invention relates generally to a waste gas disposal apparatus, and more particularly, to a waste gas disposal apparatus which efficiently eliminates toxic components of waste gas resulting from semiconductor manufacturing processes, prior to the waste gas being discharged to the atmosphere.

2. Description of the Related Art

In a semiconductor manufacturing process, various gases having toxic, corrosive or flammable properties are used. For example, in a chemical vapor deposition (CVD) process, a large quantity of silane, dichloro silane, ammonia, oxide of nitrogen arsine, porphin, diboron, boron, trichloride, etc. are required. However, the quantity of such gases that is actually used is very small, and most of the gas is exhausted to the atmosphere, including toxic components of relatively high concentration. Various other semiconductor manufacturing processes, such as low pressure CVD, plasma-enhanced CVD, plasma etching, and epitaxial deposition, generate toxic, corrosive or flammable waste gases as well. For simplicity and ease of discussion, in the following description the term "toxic" will be used to denote either toxic, corrosive or flammable properties.

In view of the emphasis and awareness of environmental issues, waste gas disposal has become a main point of concern. Under current regulations governing waste gas disposal, users of toxic gases are obligated to remove the toxic components of the waste gas prior to discharging the waste gas to the atmosphere.

While research continues in an effort to reduce the toxic components of the waste gas, particularly in the field of semiconductor manufacturing, present methods still have disadvantages.

Typically, waste gas disposal is performed using two methods, wet and dry. The wet method involves spraying or scattering water into the waste gas and then collecting the toxic particles that are reactive to the water. While the wet method is effective in reducing the toxic components of the waste gas emission, it has several disadvantages. First, drains can be damaged by the residue from the process. Also, outlet ducts can be corroded by the water particles that are scattered toward the outlet passages. Finally, the toxic reactants and water-soluble pollutants must be removed from the waste water prior to discharging the waste water, which causes inefficiencies in the manufacturing process.

FIG. 1 is a perspective diagram of a conventional wet type disposal apparatus. The wet apparatus includes an inlet chamber 220 where waste gas and air are introduced. A heating chamber 204 is situated under the inlet chamber 220 for heating the incoming waste gas mixture from the inlet chamber 220. A mixing chamber 208 is arranged under the heating chamber 204 for mixing the heated gas and water. A collecting pipe 207 is arranged under the mixing chamber 208 for collecting the mixed gas and water, and a drain 209 discharges the collected materials to the outside.

In such a wet type waste gas disposal method, incoming waste gas entering via a waste gas introducing pipe 201, and incoming air entering via an air introducing pipe 202, are mixed in the inlet chamber 220 and transmitted to the heating chamber 204. This mixture gas is heated by a heating coil 205 in the heating chamber 204. Note that the heating coil 205 can be arranged either inside or outside the heating chamber 204, or disposed within a sidewall of the heating chamber 204, as shown in FIG. 1.

Next, water is sprayed or scattered at high speed via a nozzle 206 formed at one end of a water introducing pipe 203. The water introducing pipe 203 is positioned at a central upper area of the mixing chamber 208. The high temperature mixture gas reacts with the water droplets, producing solid or liquid toxic materials. The reacted materials and unreacted non-toxic gases then flow to the collecting pipe 207.

In the final step, the reacted materials are discharged to the outside via the drain 209 while the unreacted non-toxic gas is discharged to the outside via an outlet pipe 210 and an outlet duct (not shown) extending therefrom.

However, in this wet type apparatus, a portion of the sprayed water is adsorbed to the sidewall of the heating chamber 204 and reacts with the high temperature mixture gas in the heating chamber 204, thereby forming scales on the inner sidewall of the heating chamber 204. As a result, the heating efficiency of the heating coil 205 decreases and the equipment's expected life is shortened. Further, a small portion of the reacted materials may be adsorbed to the inner surfaces of the collecting pipe 207 and the drain 209, creating difficulties in discharging the waste gas, as well as increasing the possibility of pipe or drain erosion.

FIG. 2 is a schematic diagram of a conventional dry type waste gas disposal apparatus. The apparatus is comprised of a mixing unit 303, a combustion chamber 304 disposed under the mixing unit 303, an eduction chamber 305 disposed under the combustion chamber 304, and a container 308 for receiving the resultant materials therein. An outer wall 309 surrounds the entire apparatus so as to allow cooling air 307 to be introduced into the space defined by the outer wall 309 and the container 308. The cooling air 307 mixes with purified gas and guides the waste gases to the outlet duct 314.

In such a dry type waste disposal method, the incoming waste gas enters the mixing unit 303 via a waste gas introducing pipe 301. Incoming gaseous fuel, such as LNG or LPG, enters the mixing unit 303 via a fuel introducing pipe 302. The mixing unit 303 mixes the waste gas and the fuel and then transmits them to the combustion chamber 304, where they are ignited by a combustion unit (not shown) in the combustion chamber 304. In this step, toxic components in the waste gas, such as silane for example, are ignited with oxide or air, thereby producing very fine silicon dioxide particles 312. The silicon dioxide particles 312 fall down along the inner sidewall 313 of the eduction chamber 305, aided by a cone-shaped guide 306 in the eduction chamber 305 that is rotated by a motor 311. The particles 312 are then collected in the container 308.

After the combustion step, a purified gas 315 is introduced through a slot 316, formed between the outer sidewall 309 and the container 308, to mix with the cooling air 307. The mixture is transmitted to the duct 314 via a space between the inner sidewall 313 and the outer sidewall 309. The mixture is filtered in the duct 314 and then exhausted to the outside. In FIG. 2, reference numeral 310 denotes a scrapper for scrapping or scratching off the silicon dioxide particles attached on the sidewall 313 to thereby allow then to collect in the container 308.

However, in this apparatus, a frequently encountered problem is that the educed particles block the combustion unit, causing the unit to malfunction. Further, scrupulous system management is required since the flammable gases that are used may explode at any time. Fuel consumption costs are also considerably high.

In an effort to overcome these disadvantages, a waste gas disposal apparatus such as that illustrated in FIG. 3 has been proposed. Referring to FIG. 3, the apparatus is comprised of an inlet head 10, into which waste gas, an inert gas, in particular nitrogen, and air are introduced, respectively. A heating chamber 20 disposed under the inlet head 10 heats the incoming mixed gases from the inlet head 10. A reheating unit 30 then heats the previously heated gas again. An air inlet 40 introduces another new flow of incoming air to react with the heated gas. A collecting chamber 60 collects the educed dust particles, and a residue container 70 receives the dust particles therein.

In operation, the incoming waste gas entering via the inlet head 10 is transmitted to a reaction preventive unit (not shown) by the inert gas, e.g., nitrogen. The main function of the reaction preventive unit is to permit the waste gas to react with air below a desired height of the heating chamber 20, while preventing such a reaction above the desired height.

After the reaction in the heating chamber 20, the educed fine dust particles and gas are heated again in the reheating unit 30 and then transmitted to the collecting chamber 60 by the rapidly incoming air entering through the air inlet 40.

Finally, the particles introduced into the collecting chamber 60 settle and accumulate in the residue container 70, while the purified gas is emitted from the residue container 70 via openings 71 (see FIG. 4) formed along an upper portion of the residue container 70. The purified gas is exhausted to the outside via a gap between the chamber shell 50 and the collecting chamber 60, along with the cooling air from the outside.

FIG. 4 shows a more detailed schematic view of the collecting chamber 60 and the residue container 70 of FIG. 3. Referring to FIG. 4, a pipe is provided at top of the collecting chamber 60 to allow the mixture gas, including the dust particles, to enter the collecting chamber 60 at high speed along with the rapidly dispersed air from the air nozzles 41. As shown in FIG. 4, the collecting chamber 60 is hopper-shaped 64. In the guide barrel 65 corresponding to the lower portion of the collecting chamber 60, a scraper-associated barrel 80 is provided, to which a scraper 63 is provided to scrape off solid particles from the inner surface of the hopper chamber 64.

Worm gears 95, provided on the outside of the guide barrel 65, transmit rotation force to the scraper-associated barrel 80. A detachable residue container 70 is provided under the guide barrel 65 to collect the educed solid particles therein.

FIG. 5 is a perspective view of the lower portion of the collecting chamber 60 illustrating a manner of operation of the worm gear 95, and FIG. 6 is a perspective view for illustrating the scraper 63 and the scraper-associated barrel 80 in detail.

With reference to FIGS. 5 and 6, the worm gear 95 is designed to rotate along the outer periphery of the guide barrel 65 in response to a driving force of the worm driving member 91. An L-shaped rotation rod 81 and an inverted L-shaped rod 82 are welded at one of their respective ends to the scraper-associated barrel 80, and are fixed at their other respective ends to the worm gear 95.

At the upper portion of the scraper-associated barrel 80, a scraper 63 is disposed to scrape or scratch off the solid particles from the inner surface of the hopper chamber 64. In the barrel 80, a cone-shaped plate 61 is rotatably supported by a support rod 84 (see FIG. 4).

As described above, the rotation rods 81 and 82 are welded onto the outer periphery of the scraper-associated barrel 80. This configuration allows the rotational force of the worm gear 95 to be transmitted to the scraper-associated barrel 80.

The guide barrel 65 includes two semi-circumferential grooves 83, one being positioned above the worm gear 95 and the other positioned below the worm gear 95, with the grooves 83 being offset by 180°. The rotation rods 81 and 82 move within the grooves 83, allowing for the rotational movement of the rotation rods 81 and 82 to be reversed repeatedly, thereby permitting the intermittent reversal of direction of rotational movement of the scraper-associated barrel 80, in cooperation with the worm gear 95.

The mixture gas and the fine particles 63a enter the collecting chamber 60 via the pipe connected to the upper end of the collecting chamber 60. Once entered, they are adsorbed to the inner surface of the hopper chamber 64 and the upper surface of the cone 61. At this time, the scraper-associated barrel 80 begins its rotation through an 180° arc, repeatedly reversing its direction at the end of each of the 180° arcs of movement, in response to the rotational movement of the worm gear 95. During this repeated reversing movement, the scraper 63 scratches off the solid particles adsorbed on the inner surface of the hopper chamber 64. At the same time, the particles 63a on the top surface of the cone 61 are scratched off, allowing them to fall down around the inner periphery of the hopper chamber 64, and the particles are finally stored in the residue container 70 provided at the bottom of the apparatus.

This conventional disposal apparatus is relatively efficient at toxic gas disposal. However, the repeated direction-reversing rotation of the scraper 63 causes some reduction in the scraping motion, which affects the scraping movement performance and lowers the particle collection efficiency. Further, the construction, production and assembly of the worm gear 95, scraper-associated barrel 80 and guide barrel 65 of the collecting chamber 60 are somewhat difficult.

Further, since the rotation of the worm gear 95 must be repeatedly reversed by 180°, a sensor and controller are needed to check and control such worm gear 95 rotation. Not only does such an additional sensor and controller raise the production costs, they can themselves malfunction, causing further problems.

SUMMARY OF THE INVENTION

In view of the above, it is an object of the present invention to provide a waste gas disposal apparatus which efficiently removes solid dust particles adsorbed to an inner surface of a collection chamber shell, and one which is easy to manufacture and produce.

Another object of the present invention is to provide a waste gas disposal apparatus having scraper driving unit that is easily controlled, and one which has an economical manufacturing design.

According to the present invention, there is provided a waste gas disposal apparatus, comprising: an inlet head into which waste gas, inert gas and air are respectively introduced to create a mixed gas; a heating chamber disposed under the inlet head for heating the mixed gas from the inlet head, thereby creating fine reactant particles after a heating reaction occurs in the heating chamber; a collecting unit connected to the heating chamber for collecting the fine reactant particles from the heating chamber, the collecting unit having a hopper-shaped chamber shell and a guide barrel connected to a lower end of the hopper chamber; a collection inducing portion fixed to the guide barrel for guiding the fine reactant particles to the guide barrel; means for scrapping off any fine reactant particles adsorbed to an inner wall of the chamber shell or a surface of the collection inducing portion; and a residue container connected to the collecting unit for storing the fine reactant particles therein.

The means for scraping comprises a scraper rotating portion for rotating a scraper configured to simultaneously scrape off fine reactant particles adsorbed to the inner surface of the chamber shell and the surface of the collection inducing portion.

The apparatus further comprises a scraper rotating gear disposed in the guide barrel, and a driving gear interconnecting with the scraper rotating gear through an aperture formed in a side of the guide barrel. The guide barrel includes a circumferential groove formed along an inner surface, into which the scraper rotating gear is rotatably disposed.

A scraper support rod is connected at one end to the scraper for supporting the scraper, and connected at a second end to the scraper rotating gear. The scraper rotating gear rotates through a 360° arc centered around the scraper support rod.

In addition, the collection inducing portion includes a cone-shaped member supported by a cone support rod, with the cone support rod being coaxially disposed within a central axial opening in the scrapper support rod.

DETAILED DESCRIPTION OF THE PREFERRED EMBODIMENTS

Figure 1:
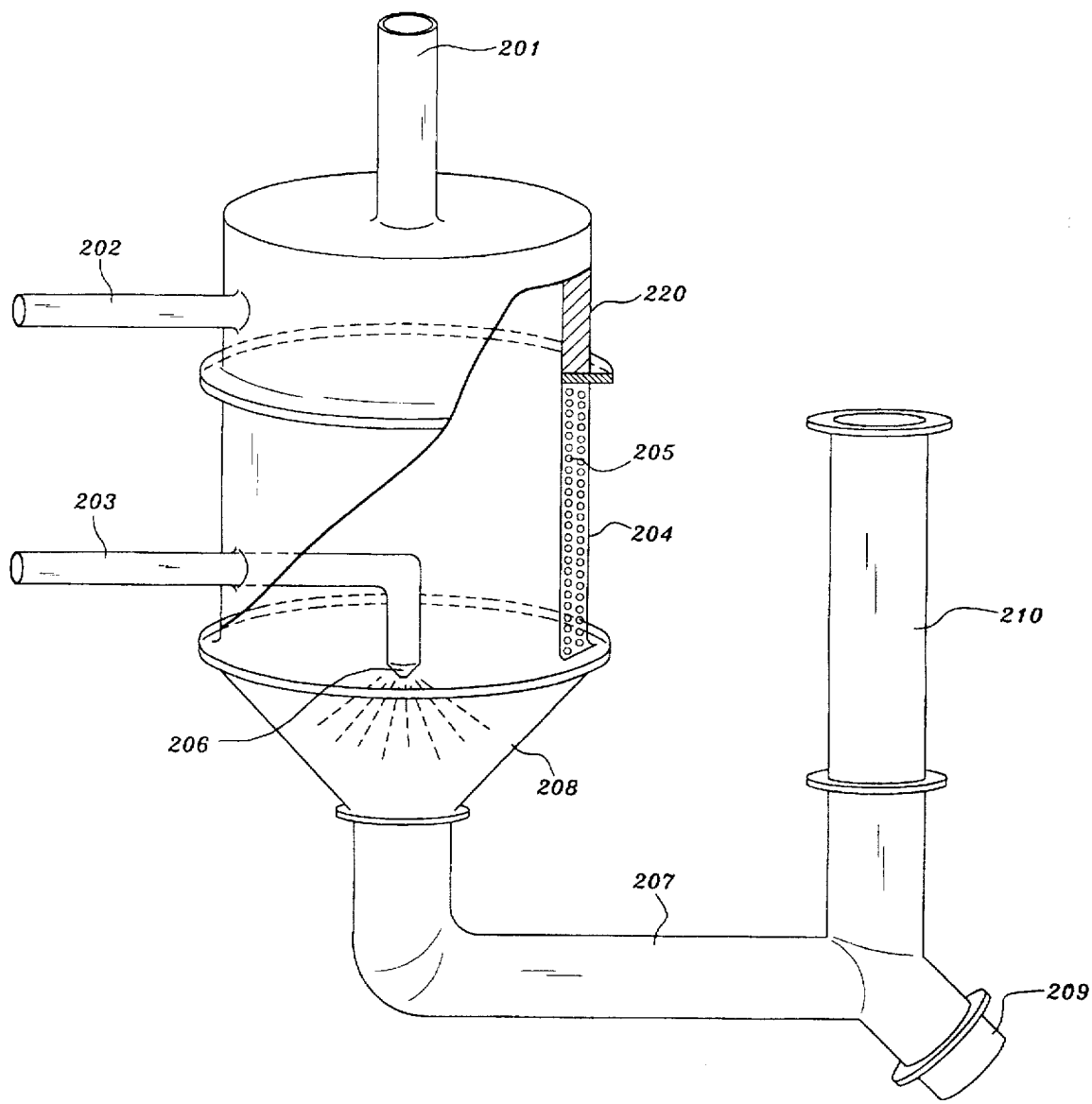
FIG. 1 is a perspective view, partly in section, of a conventional wet type waste gas disposal apparatus.
Figure 2:
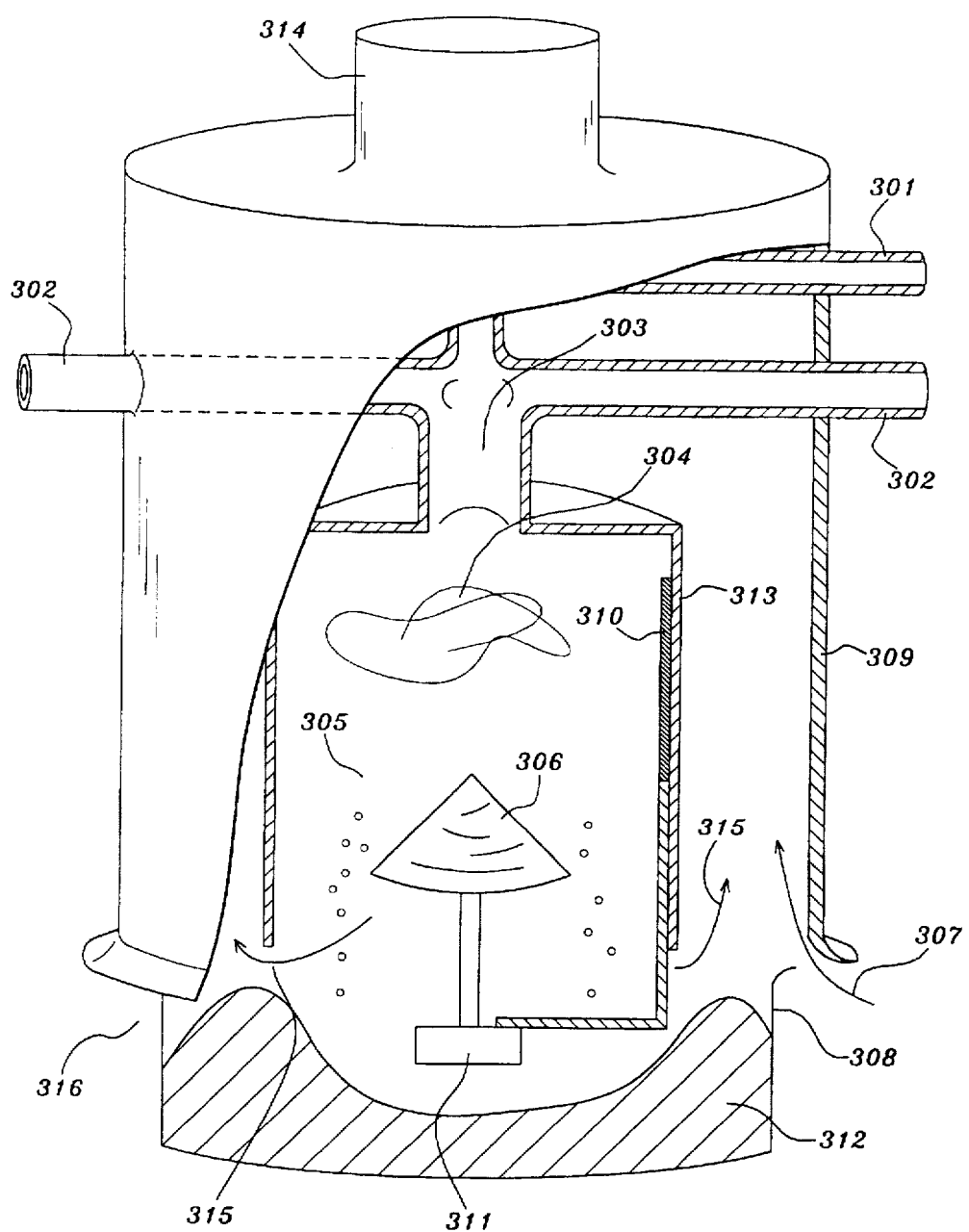
FIG. 2 is a perspective view, partly in section, of a conventional dry type waste gas disposal apparatus.
Figure 3:
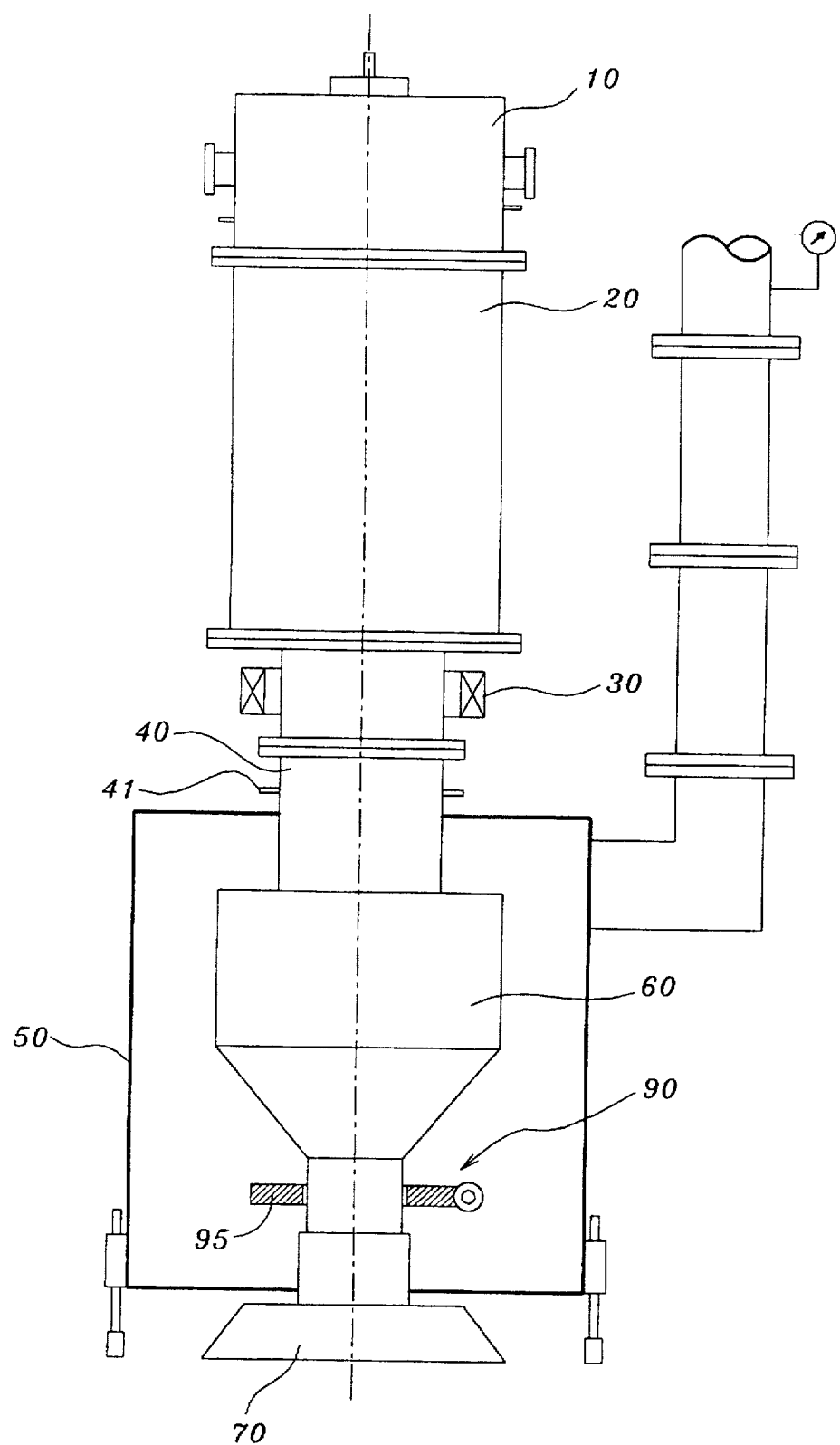
FIG. 3 is a schematic view of another conventional waste gas disposal apparatus.
Figure 4:
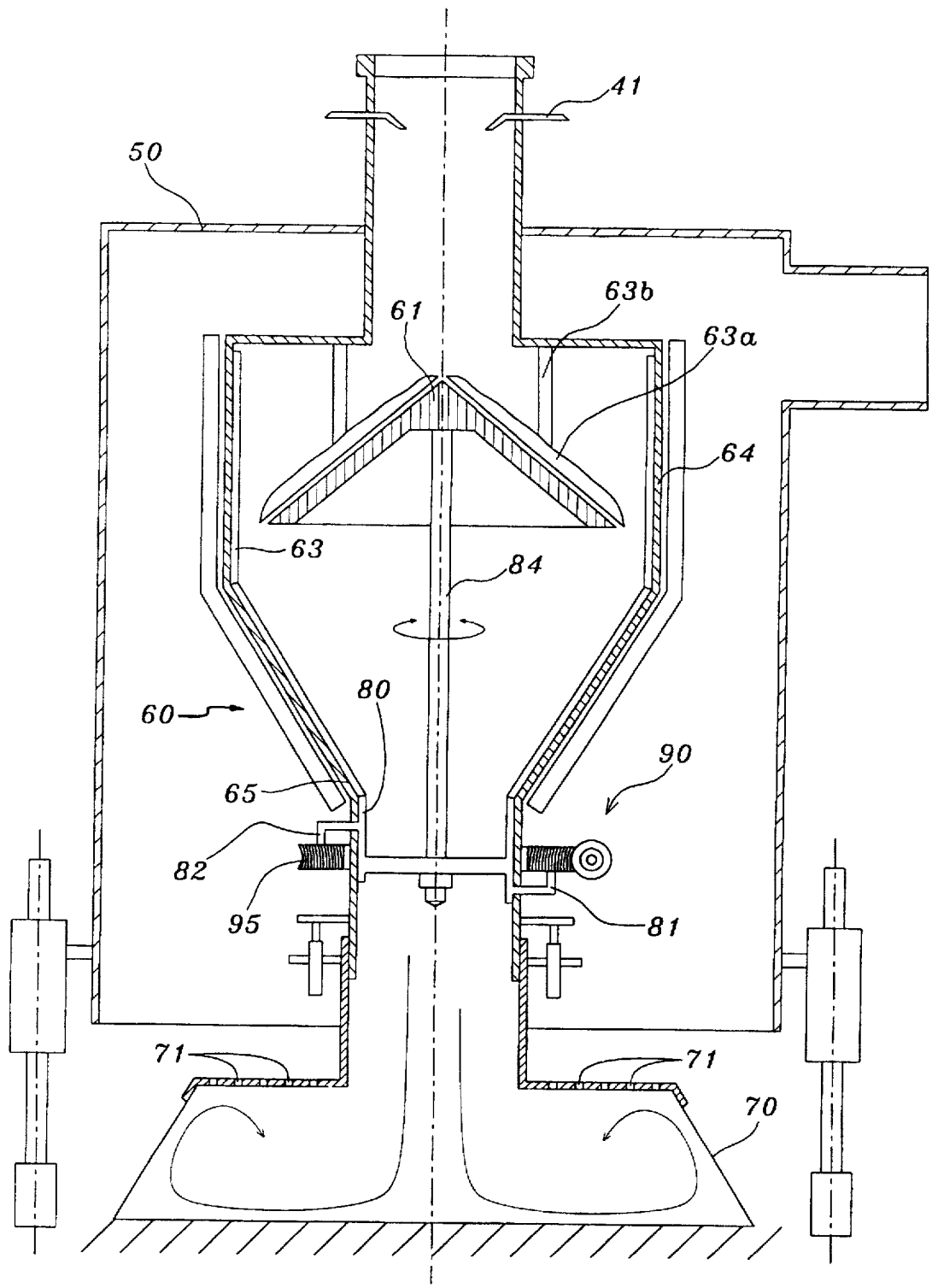
FIG. 4 is more detailed schematic view of the collecting chamber and the residue container of FIG. 3.

In general, certain aspects of the overall construction and operation of the present invention are somewhat similar to those of the conventional device of FIG. 4. Therefore, only the improved parts and operations thereof are described below with reference to FIGS. 7–9.

Figure 7:
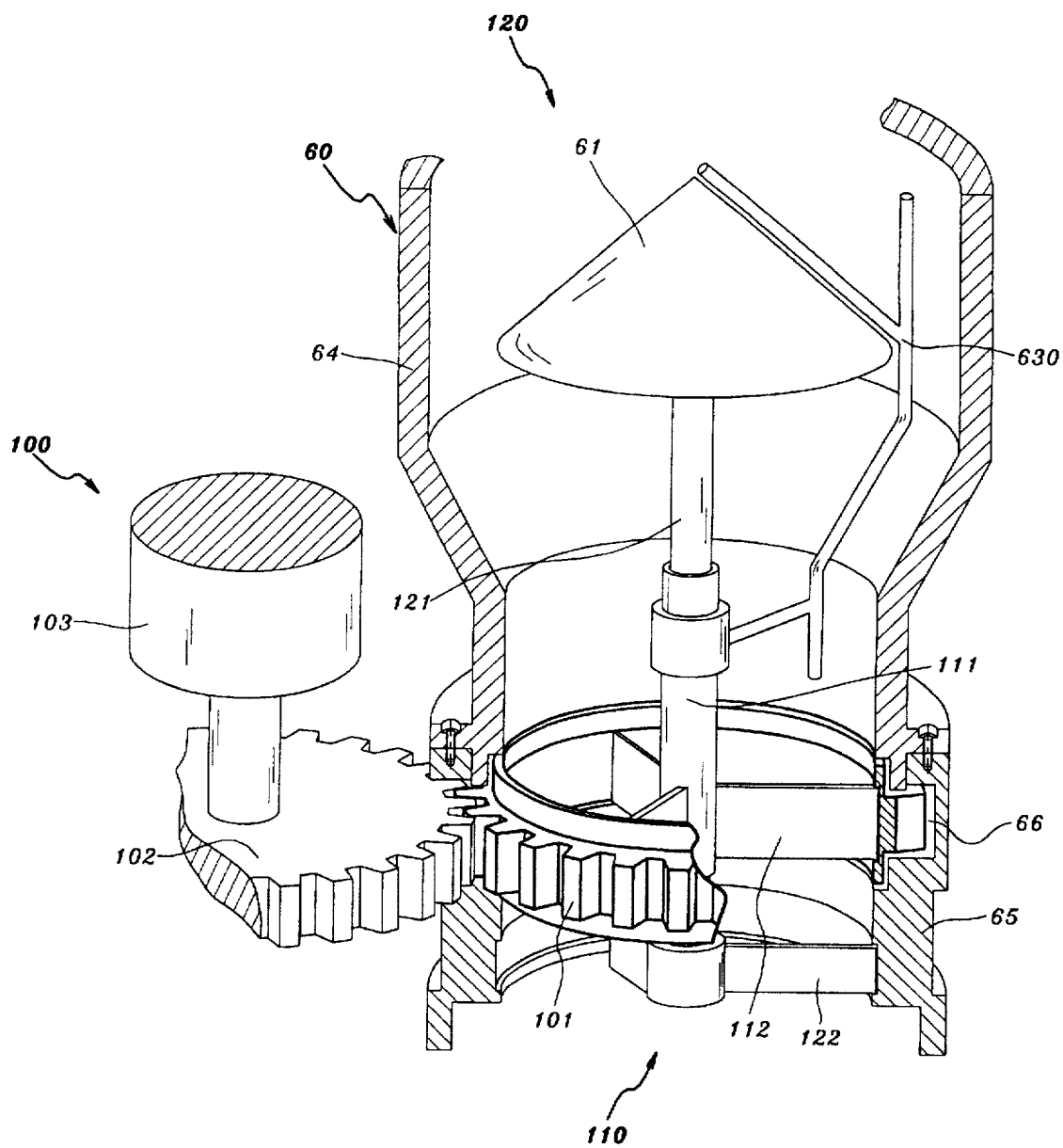
FIG. 7 is a perspective view for illustrating a collecting chamber and a scraper driving portion cooperating with each other according to the present invention.

Referring to FIG. 7, the waste gas disposal apparatus of the present invention includes a collecting chamber 60 comprising a hopper-shaped chamber 64 and a guide barrel 65 connected to the lower end of the hopper chamber 64. A collection inducing portion 120 is fixed to the guide barrel 65 for guiding the educed particles to the guide barrel 65. A scraper rotating portion 110 rotates the scraper 630 to scrape off the solid particles adsorbed to the inner surface of the hopper chamber 64 and the surface of the collection inducing portion 120. The present invention also includes a scraper driving portion 100 that comprises a motor 103 and a driving gear 102 for transmitting the driving force of the motor 103 to the scraper rotating portion 110.

The collection inducing portion 120 comprises a cone-shaped member 61 for inducing the collection of the particles, a cone support rod 121 for supporting the cone 61, and a cone support stand 122, which interconnects the lower portion of the cone support rod 121 and the guide barrel 65 to secure the cone support rod 121 in an upright position.

Figure 9:
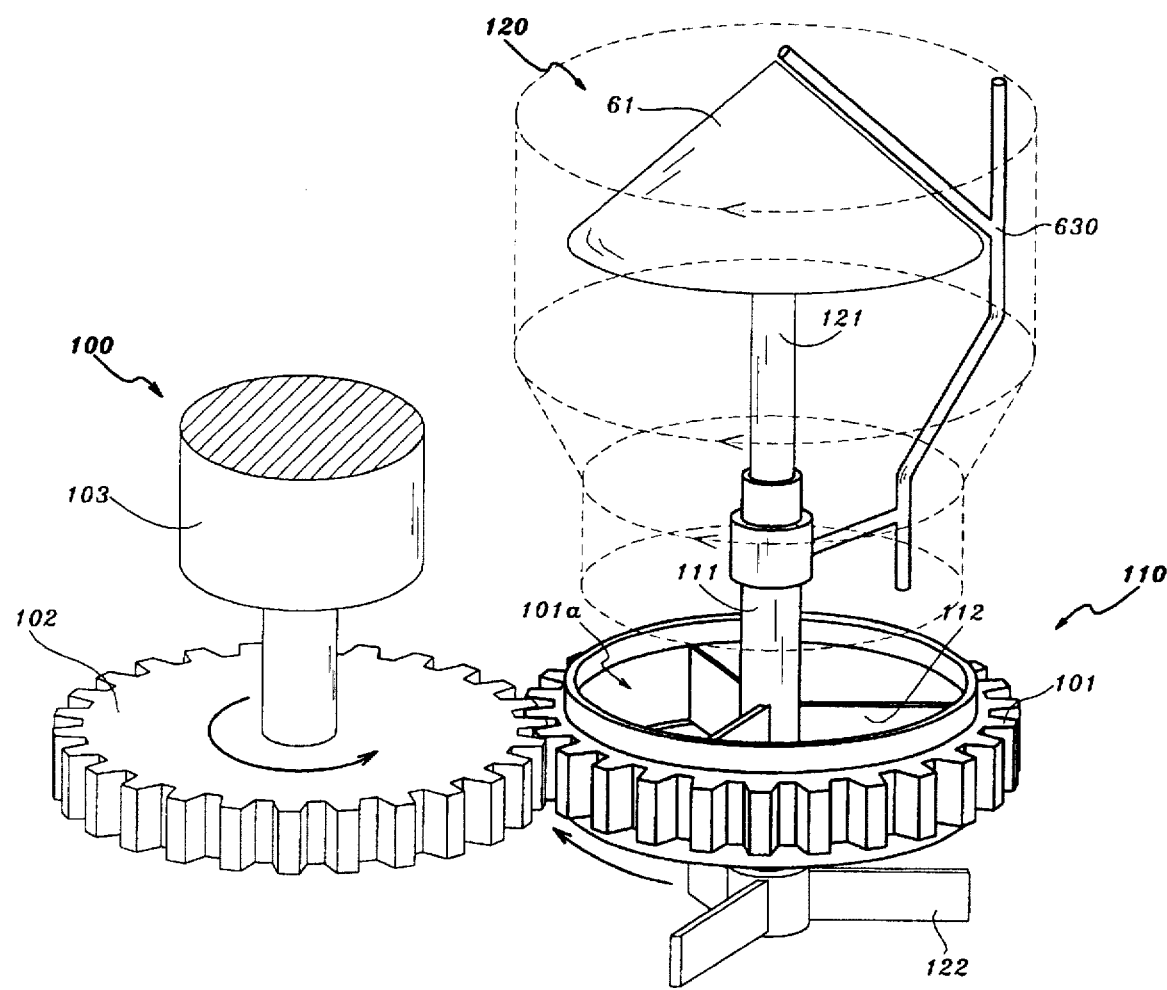
FIG. 9 is a perspective view for illustrating the interconnection of the collection inducing portion and the scraper rotating portion, as well as illustrating the rotating operation of the scraper according to the present invention.

The scraper rotating portion 110 comprises a scraper 630 for scratching off the solid particles adsorbed to the inner surface of the hopper chamber 64 and the top surface of the cone 61. As shown in FIGS. 7 and 9, the shape of the scraper 630 can best be described as a "bent-Y" having two forks. One fork conforms to the hopper shape 64 of the collecting chamber and the second fork conforms to the surface of the cone 61. By rotating the scraper 630, therefore, the scraper 630 is able to simultaneously scrape off solid particles adsorbed to the inner surface of the hopper chamber 64 and the top surface of the cone 61.

A cylindrical scraper support rod 111 is used to mount the scraper 630 thereon. A scraper rotating gear 101 rotates the scraper 630 in response to the driving force of the motor 103. A scraper support stand 112 interconnects the scraper support rod 111 and the scraper rotating gear 101.

Figure 8:
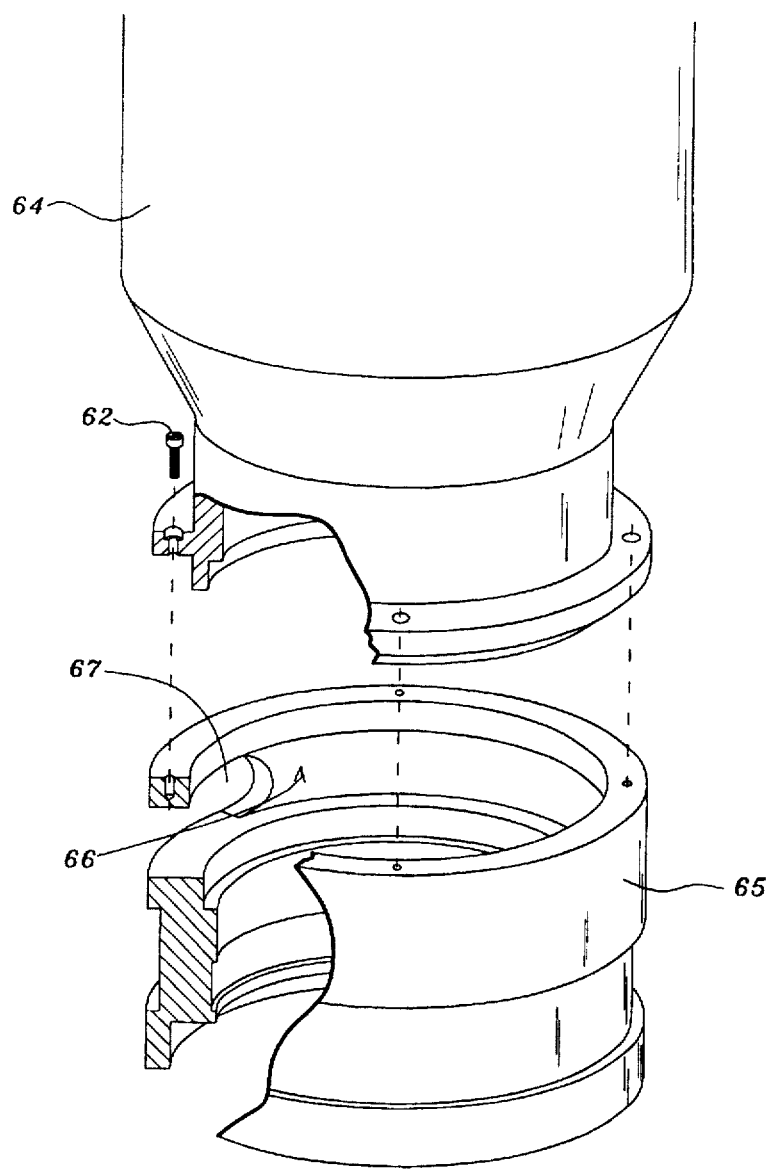
FIG. 8 is a perspective view providing a more detailed view of the hopper chamber and the guide barrel of the present invention.

FIG. 8 is a exploded perspective view to provide a more detailed view of the engagement of the hopper chamber 64 and the guide barrel 65. The guide barrel 65 and the hopper chamber 64 are designed to be detached from each other. As shown in FIG. 8, the guide barrel 65 and the hopper chamber 64 are attached by clamping or securing members 62. These clamping or securing members may be screws or other equivalents device that allow the guide barrel 65 and the hopper chamber 64 to be assembled and unassembled.

The guide barrel 65 includes a circumferential groove 66 formed along an inner surface thereof, into which the scraper rotating gear 101 is disposed to allow the scraper rotating gear to rotate through a 360° arc. The scraper rotating gear 101 can rotate in a clockwise or counter clockwise direction, depending on the rotation of the motor 103. As shown in FIG. 9 for example, the rotation of the scraper rotating gear 101 is in the clockwise direction.

Referring again to FIG. 8, the groove 66 contains a partial opening 67 in the sidewall of the guide barrel 65, where the driving gear 102 and the scraper rotating gear 101 are engaged to permit the scraper rotating gear 101 to be rotated in response to the rotation of the driving gear 102.

FIG. 9 is a perspective view for illustrating the interconnection of the collection inducing portion 120 and the scraper rotating portion 110, as well as illustrating the rotating operation of the scraper 630. As shown in FIG. 9, the cylindrical scraper rotating gear 101 has a hollow area 101a where the cylindrical scraper stand 112 is positioned and fixed to the inner surface of the scraper rotating gear 101. The scraper support rod 121 is secured upright by the scraper support stand 112 at the center of the hollow area 101a.

The cone support rod 121, secured to the lower portion of the guide barrel 65 by the cone support stand 122, supports the cone 61. The cone support rod 121 coaxially penetrates the scraper support rod 111 positioned at the center of the scraper rotating gear 101, so that the cone support rod 121 functions as a rotation axis of the scraper rotating gear 101.

The operation of the collecting chamber 60 in accordance with the present invention is described below with reference to FIGS. 7 and 9.

After the mixed gas and dust particles are heated by the reheating unit 30 and then reacted with air introduced through the air inlet 40, the fine resultant particles are adsorbed to the inner surface of the hopper chamber 64 and the top surface of the cone 61. Next, the scraper rotating gear 101 starts to rotate along the groove 66 formed in the guide barrel 65, responsive to the rotation of the driving gear 102 and the motor 103. With the cone support rod 121 as a rotation axis, the scraper 630 is simultaneously rotated along the inner surface of the hopper chamber 64 and the upper surface of the cone 61.

As a result, the absorbed particles are scratched off by the rotating scraper 630, with these fine particles flowing down through the hollow area 101a of the scraper rotating gear 101 and toward the residue container 70.

Since the scraper 630 is designed to be fixed to the scraper support rod 111, which is formed coaxially with the cone support rod 121 and rotated through a 360° arc, the present invention achieves a much higher collection efficiency compared with the conventional devices that only rotate through a 180° arc, and must repeatedly reverse direction. Further, the lack of the need to repeatedly change directions reduces the load on the scraper driving portion 100 that rotates the cone 61.

An additional advantages is that no sensing unit and complex control units are required to check the rotation of the gears and to control of the rotation of the scraper driving portion, and the desired rotation can be obtained by simply using a motor capable of rotating in a single direction, although a bi-directional motor may be used as well.

Figure 5:
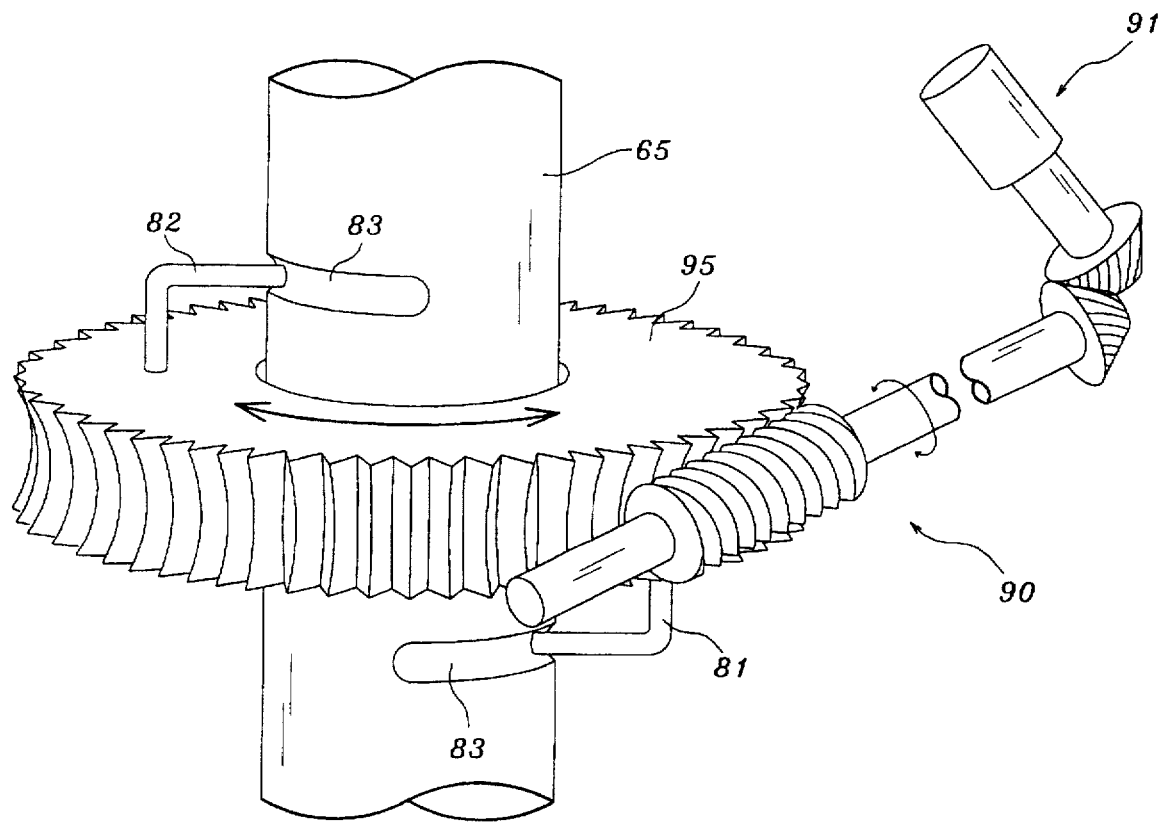
FIG. 5 is a perspective view of the lower portion of the collecting chamber of FIG. 4, illustrating a manner of operation of the worm gear.
Figure 6:
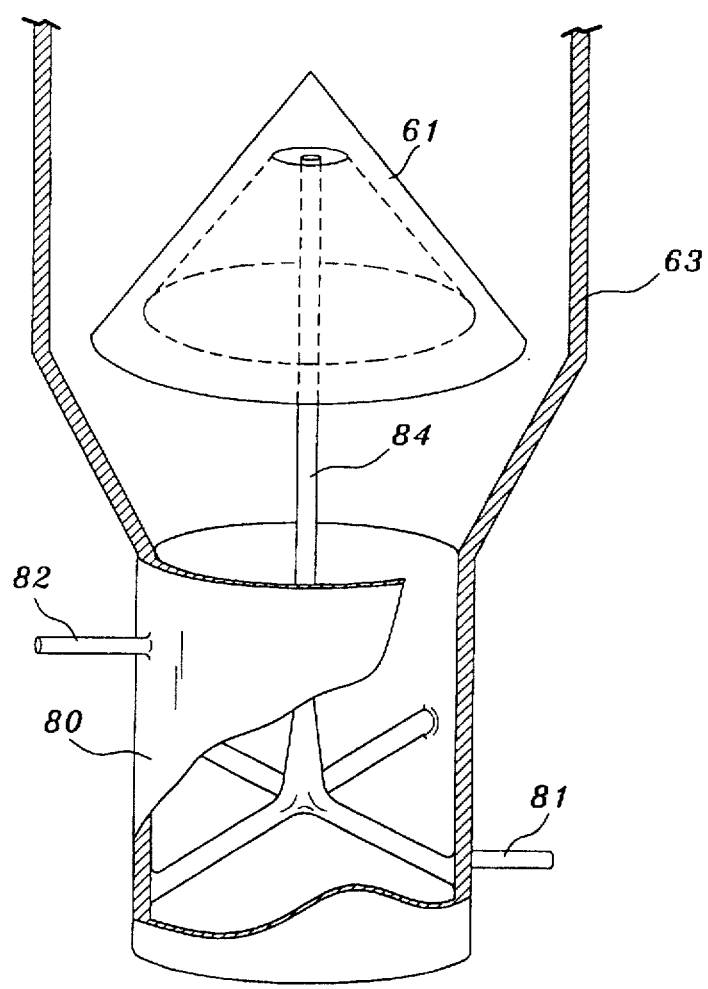
FIG. 6 is a perspective view illustrating in greater detail the scraper and a scraper-associated barrel of FIG. 4.

As shown in FIG. 8, the hopper chamber 64 and the guide barrel 65 are designed to be detached from each other, which creates advantages in the manufacturing process of the waste gas disposal apparatus. For example, with the present invention, there is no need to form the grooves 83 on the guide barrel 65 and weld the rotation rods 81 and 82 to the scraper-associated barrel 80 as in the conventional device shown in FIGS. 5 and 6. Therefore, the overall manufacturing process becomes relatively simple and quick, thereby decreasing manufacturing costs.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A waste gas disposal apparatus, comprising:

an inlet head into which waste gas, inert gas and air are respectively introduced to create a mixed gas;

a heating chamber disposed under said inlet head for heating the mixed gas from said inlet head, thereby creating fine reactant particles after a heating reaction occurs in said heating chamber;

a collecting unit connected to said heating chamber for collecting said fine reactant particles from said heating chamber, said collecting unit comprising a hopper-shaped chamber shell, a guide barrel connected to a lower end of said chamber shell, and a guiding member for guiding said fine reactant particles to the guide barrel, said guiding member being fixed to one end of a shaft, and another end of said shaft being fixed to said guide barrel;

a scraper portion comprising a ring shaped scraper rotating gear which is inserted into a groove formed along an inner circumference of said guide barrel, a scraper guide rod rotatably fitted onto said shaft and connected to an inner circumference of said scraper rotating gear, a power transmitting gear interconnected with said scraper rotating gear through an aperture formed at a predetermined position in said groove, and a scraper blade connected to said scraper guide rod and configured to simultaneously scrape off fine reactant particles adsorbed to an inner surface of said chamber shell and a surface of said guiding member; and a container connected to said collecting unit for receiving said fine reactant particles from said guide barrel.

2. The apparatus of claim 1, wherein said scraper guide rod defines a central axis of rotation of said scraper rotating gear.

3. The apparatus as set forth in claim 2, wherein the scraper rotating gear rotates in a clockwise direction.

4. The apparatus as set forth in claim 2, wherein the scraper rotating gear rotates in a counter clockwise direction.

5. The apparatus of claim 2, wherein said scraper rotating gear is connected to said scraper guide rod by a first support stand.

6. The apparatus of claim 5, wherein said scraper rotating gear rotates through a 360° arc centered around said scraper guide rod.

7. The apparatus of claim 6, wherein said shaft is connected to said guide barrel by a second support stand.

8. The apparatus as set forth in claim 1, wherein said guide barrel is detachably attached to the lower end of the hopper chamber using a securing means.

9. The apparatus as set forth in claim 1, wherein said residue container is detachably attached to the collecting unit using a securing means.

10. The apparatus of claim 1, said scraper blade having two forks where one fork conforms to said hopper-shaped chamber shell and a second fork conforms to said surface of said guiding member.

\* \* \* \* \*